April 11, 1939. R. H. THIELKING 2,154,057
METHOD OF COATING
Filed July 25, 1938
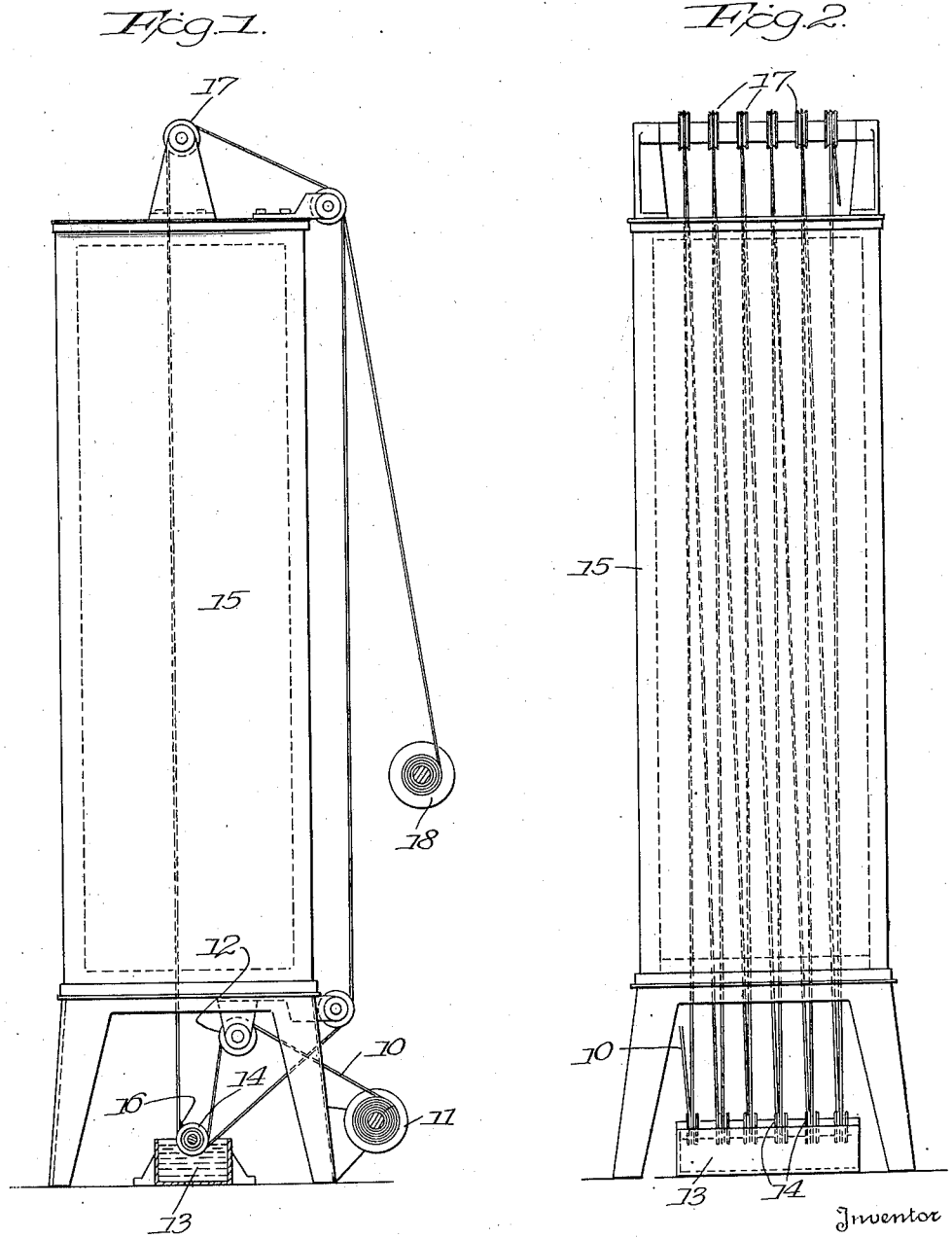
Inventor
Raymond Henry Thielking.
By Cushman Darby & Cushman
Attorneys Patented Apr. 11, 1939

2,154,057

UNITED STATES PATENT OFFICE 2,154,057

METHOD OF COATING

Raymond Henry Thielking, Amsterdam, N. Y., assignor to Schenectady Varnish Company, Schenectady, N. Y., a corporation of New York Application July 25, 1938, Serial No. 221,255

22 Claims. (Cl. 91—70)

This invention relates to varnishes and to a method of coating the same upon objects to be protected. The varnish is useful for general application, but is particularly valuable as a coating for wire, e. g., copper magnet wire for forming a protective insulating covering thereon.

The principal constituent of the varnish, i. e., the varnish base, is a polyvinyl acetal resin of the character described, for example, in the patent to Morrison et al., 2,036,092, granted March 31, 1936, and modified forms of such resins as sold by Shawinigan Chemicals, Ltd., under the trade names "Formvar", "Butvar", "Alvar", etc.

These acetal resins have been recognized as possessing excellent insulating properties, adherence to metal and suitability for wire coating, and give enhanced hardness and flexibility, resistance to solvents, heat, and abrasion, and are durable and permanent so that the coating on the wire has a substantially longer life than is true with ordinary oleoresinous varnishes and polyvinyl compounds heretofore used in wire coating.

Attempts to utilize the advantageous properties of such acetal resins have not been commercially successful because of difficulties incident to (1) applying the varnish and forming a uniform, smooth coating and (2) finding a consistently reliable composition. Furthermore, and of equal importance, it has heretofore been impossible to utilize the customary wire enameling machinery with proposed varnishes containing these acetal resin bases, and this has likewise mitigated against the use of such varnishes because the industry is resistant to either undergoing the expense of complete replacement of present machinery, or the introduction of other methods and machinery which are not of completely demonstrated reliability.

The problem is therefore substantial because of the nature of the polyvinyl acetal resin as compared with usual oleoresinous types of enamels which are customarily used. That is to say, with the ordinary varnishes it is a comparatively simple matter to adjust the solid portion of the enamel so that the correct viscosity of the solution coupled with a correct amount of film forming ingredients is obtained to produce an evenly and uniformly flowing enamel coating of adequate thickness. However, with polyvinyl acetal resins, the varnishes are extremely viscous solutions and even in their most powerful solvents a ten per cent solution of the resin has such a heavy viscosity that it is impossible to utilize the solution in the ordinary wire enameling machine. Moreover, in the case of polyvinyl acetal resin varnishes, there is a tendency for the varnish to surface dry between the enamel bath and the baking oven. Again, there is the customary condition of having the varnish collect or gather in the bight between the shive of the coating bath and the wire travelling to the oven, whereby irregularities and thickened portions build up on the coating. All of these difficulties have prevented any substantial use of the very satisfactory resin for wire coating purposes and the use of complicated wipers or dies has not satisfactorily solved the problem from the commercial standpoint.

It is, therefore, a particular object of the invention to provide an improved method of coating wire with a polyvinyl acetal containing varnish and forming thereon a hard, smooth, nice appearing coating in continuous operation. A further object of the invention is to provide an improved method of coating wire in a commercially satisfactory manner by using existing wire enameling machinery.

I have discovered that the several object ns above outlined are overcome and a commercially satisfactory product obtained, by having the coating of such flowability during the initial stages of the baking that it will distribute evenly over the wire and form a uniform coating before the same is finally hardened in the oven. Such procedure eliminates irregularities and thickened areas and takes care of the accretions resulting from varnish collecting on the wire at the outlet bight of the shive. With a smooth hard coating of nice appearance, as distinguished from one possessing irregularities, there is no danger of the coating being chipped off or abraded in use and the product is highly suitable for all purposes. This rendering of the polyvinyl acetal containing varnish of even spreadability during the initial baking period is apparently a resultant of controlling the viscosity or the surface tension of the coating so that it will evenly distribute before it is finally hardened, notwithstanding that the coating be irregular and have become surface hardened after leaving the bath and before entering the oven.

In the usual type of wire enameling machine, the enamel tends to collect in the bight between the shive and the wire traveling to the oven. Such varnish accumulation being thick, is collected upon the wire as a thickened area, and if the varnish be of the type which is not readily dispersible or flowable, i. e., of an insufficiently low surface tension or viscosity, the wire will be irregularly coated. The method of the present invention overcomes any possibility of such a contingency.

In this connection, it is impractical to subject the varnish to air drying because of the high baking temperatures which are required and the very extended time period which would be necessary to remove solvent and form a completely dried coating. Also, it is impractical to subject the wire to progressively increasing temperatures, since this is not economical and reduces substantially the yield as well as increases the cost of coating.

Therefore, the problems solved by the present invention are of a very practical character and affect not only the quality of the finally coated product but the economics of its production as well.

Where available polyvinyl acetal varnishes have been used on a machine having a wiper or die, it has been found difficult to keep the machinery running because of the tendency of the opening through which the wire passes to gradually plug up with the varnish due to the viscosity and surface drying of the varnish, created by the presence of the acetal resin. Moreover, there is the further objection that the wire passing at a high rate of speed through such an opening will cause strings of the varnish or globules thereof to be drawn off and deposited on the die to not only plug the same, but to interfere with the production of a uniform smooth coating and, in fact, the coating frequently contains dirt and other objectionable matter. As will be appreciated a very vital part of any successful wire enameling process is the actual application of the enamel to the wire prior to the baking process and before the same is hardened in the baking operation. It, therefore, becomes particularly important in the case of varnishes having an acetal resin base, for reasons explained above, to eliminate both expensive machinery and procedure which cannot be relied upon to consistently give a uniform clean coating in continuous operation.

As explained above, the effect of producing a smooth and even coating is not one of flow alone. Any slow evaporating solvents such as furfural have good flowing properties but because of their high surface tensions produce lopsided films which have abnormal thickness on one side of the wire and extreme thinness of coating on the opposite side.

With previous varnishes using a polyvinyl acetal resin as a base and in order to obtain a coating of enamel of reasonable thickness, such a thick film has to be applied that it sags of its own weight causing reflows and irregularities of films. If a thin enough coating is applied to produce an even film, not enough film forming ingredients are present to produce a sufficiently thick film, and, therefore, so many thin films must be successively applied that ultimately the first coats are burned up by the subsequent baking operations before the top films are dry. Moreover, I have noticed that small irregularities are magnified with each succeeding film. The present invention commercially satisfactorily overcomes the several difficulties above related by a process which, as stated, assures that during the initial baking, the coating is rendered so flowable as to evenly distribute itself, whereby when it hardens under the continued baking treatment, a smooth, nice appearing, coating is produced having all of the desirable properties of the polyvinyl acetal resin containing varnish.

It is another object of the invention to provide an improved varnish composition containing a polyvinyl acetal resin. That is to say, present solutions of such resins have not proven commercially satisfactory, as wire coating materials, in that it has not been possible to produce a film of the optimum hardness, smoothness, regularity and nice appearance, as well as resistant properties which varnishes containing such resins are capable of forming. I have tried a mixture of a polyvinyl acetal resin and dioxan, as well as a mixture of furfural and polyvinyl acetal resin in varnishes having a required coating viscosity. When such varnishes are run on the ordinary wire enameling machinery, a lopsided and irregular coating is formed which for most purposes is useless.

The present invention provides a varnish composition which permits the various desirable results above-mentioned to be obtained at the optimum, notwithstanding that the coating may possess irregularities or thick and thin portions and be surface dried before it is introduced to the baking oven.

The composition of the present invention includes in addition to the acetal resin, as an essential ingredient, a solvent plasticizer for the resin. Also, for the purpose of economically rendering the varnish of required coatable viscosity, e. g., for use in a bath, I preferably include a primary solvent or diluent.

I have discovered in the conventional wire enameling machine that by using a solvent plasticizer in proper amount relative to the amount of the resin and with a diluent or primary solvent, or without the latter providing the solvent plasticizer is used in amount to form a coatable solution the coating is maintained on the wire so flowable during the early stages of baking that the coating will evenly distribute itself upon the wire prior to finally hardening, whereby a uniform, smooth, film is obtained of required thickness and notwithstanding that the wire as introduced to the oven had an irregular coating and was surface dried. That is to say, the solvent plasticizer maintains the coating during the initial period of baking and after evaporation of primary solvent and diluent which occurs when the wire enters the oven, at such a viscosity or so reduces the surface tension of the coating that the same distributes evenly and uniformly over the wire before the coating is finally hardened. The solvent plasticizer is relatively high boiling and being, therefore, slower evaporating, further contributes to the aforementioned result of maintaining the coating flowable during initial baking and after evaporation of primary solvent or the diluent.

The action of the solvent plasticizer whereby the aforementioned remarkable results are obtained is not entirely clear. The solvent plasticizer appears to either cause further polymerization of the resin or to act as a catalyst to produce favorable rearrangement of the chemical structure thereof. It is possible that the solvent plasticizer itself is polymerized or copolymerized with or combines with the resin.

It appears that when a solvent plasticizer of the phenol type such as chlorinated diphenyl is initially mixed with the resin, there is formed an addition product which has a better solubility than the resin alone in primary solvents. Also, it is possible that in the presence of the solvent plasticizer the gel structure of the polyvinyl acetal resin is changed, particularly after primary solvent has been evaporated from the wire during the initial stages of baking. In the baking of the coating, the chlorinated diphenyl appears to chemically combine with the resin, possibly with the methylal formation thereof, and thus changes the nature of the resin, i. e., condense with the same to form a new hard, tough, coating film.

This is confirmed by the fact that with a composition including the resin, the aforesaid phenol solvent plasticizer, and a primary solvent, after heating until the solvent is driven off, the flowable resinous mass which remains, gradually increases in viscosity and becomes harder and tougher. This hardening result takes place very rapidly at 500° F., and when the fluid resinous mass is heated for ten minutes at this temperature, a hard, tough material is obtained which can be cut only with difficulty with a jack knife. When it is considered that chlorinated diphenyl is a liquid which boils at 750° F., it is evident that the polyvinyl acetal resin and phenol have been reacted, since the reaction product of the test discloses entirely different physical characteristics than does a mere mechanical mixture of the two constituents. The mechanical mixture is a liquid whereas the reaction product is a hard, tough, insoluble solid.

When a varnish composition including the resin, a primary solvent or diluent and a vegetable oil solvent plasticizer such as cashew nut shell liquid, which is commercially available, is employed, a similar improved coating is obtained. It appears that in the baking operation, the cashew nut shell liquid oxidizes and polymerizes simultaneously with the hardening of the resin.

The aforementioned reactions which are illustrative of the invention appear to substantially aid in carrying out my improved method as above described. That is to say, the use of the solvent plasticizer in the composition maintains the varnish flowable with marked evenness on the surface of the wire during the initial baking treatment and after the solvent has been driven off, whereby upon final hardening, a smooth, continuous and uniform coat is formed.

It is to be understood that various solvent plasticizers may be added to the polyvinyl acetal resin for carrying out the present invention, and, therefore, I do not wish to be limited to the present disclosure. I have discovered that if the resin is combined with a solvent plasticizer in proper amount and preferably, but not necessarily, with a proper amount of a solvent or diluent that an inexpensive composition is produced which can be reliably used on customary continuous wire enameling machinery to give the aforesaid improved results. Therefore, the invention is considered to comprehend compositions having equivalent components or chemical structure whereby the same results are obtained.

I have referred herein to a conventional type of wire enameling machine, and in order that the invention will be understood, the accompanying drawing diagrammatically illustrates such a machine, particularly showing the difficulty created in the use of a polyvinyl acetal resin base by the collection of varnish in the bights between the shives and the wire traveling toward the oven. While I have illustrated a vertical type of enameling machine, this invention is equally applicable to the conventional horizontal types of machinery, and can also be employed with machines embodying a die or wiper.

Referring to the drawing,

Figure 1 is an end elevation, and

Figure 2 is a side elevation.

The wire is indicated at 10 and travels from the roll 11 over an idler 12 to a varnish bath 13 in which are disposed a multiplicity of shives 14 in spaced relation. The wire passes around the first shive through the bath and travels vertically toward the oven 15. At 16, I have illustrated the accumulation or collection of varnish which takes place in the bight between the wire traveling to the oven and the shive. The wire passes through the oven where the coating is dried, and then passes over a shive 17 and back to the bath and over the succeeding shives. This operation is continued until a sufficient number of coats have been baked upon the wire and the wire is finished, whereupon it is wound upon the coiler 18.

As previously explained, the accumulation or collection of varnish which takes place at 16 serves to make the coating on the wire lack uniformity, but with the present invention such irregularities are eliminated by reason of maintaining the varnish flowable during the initial baking period whereby it evenly spreads before final hardening.

The invention is illustrated by the following examples, but it is to be understood, that other solvent plasticizers, for example, rosin, may be utilized with satisfactory results and this is also the case with the solvents or diluents.

*Example I*

| | Grams |
|---|---|
| Formvar 15–95 | 25 |
| M. P. Cresol 5° | 2.5 |
| Dioxan | 225 |

*Example II*

| | Grams |
|---|---|
| Dioxan | 75 |
| 1.2.4 Xylenol | 25 |
| Formvar 15–95 | 10 |

*Example III*

| | Grams |
|---|---|
| Formvar 15–95 | 10 |
| 1.2.4 Xylenol | 90 |
| Coal tar naphtha | 75 |

*Example IV*

| | Grams |
|---|---|
| Formvar 15–95 | 10 |
| "High boiling acids" | 60 |
| Aniline | 40 |

*Example V*

| | Grams |
|---|---|
| Formvar 15–95 | 25 |
| Chlorinated diphenyl | 10 |
| Dioxan | 215 |

*Example VI*

| | Grams |
|---|---|
| Formvar 15–95 | 10 |
| Cashew nutshell liquid | 20 |
| Dioxan | 200 |

The proportions above described may be varied to produce any required coating and in order to obtain a varnish of the necessary coatable viscosity.

In each of the above examples, Formvar 15–95 as furnished by the Shawinigan Chemicals, Ltd., was employed, and it is to be understood that the invention is not limited to this resin, but is equally applicable to other types of polyvinyl acetal resins and modified forms thereof. The use of "Formvar" in the examples is therefore solely for purposes of illustration.

It is to be understood that while I prefer to use a relatively cheap thinner or diluent for economy purposes, this is not absolutely necessary, and the composition may consist entirely of the resin and a suitable solvent plasticizer. The composition of the solvent, solvent plasticizer and resin is prepared for economic reasons.

As will be appreciated, when the varnish comes in contact with the heat of the wire enameling oven, the solvent or diluent promptly evaporates, leaving on the wire a flowable resinous mass. Although the coating on the wire, as introduced to the oven, may have possessed irregularities, its conversion to such a flowable condition causes the varnish to evenly distribute over the wire, i. e., the varnish is maintained in spreadable state during initial stages of the baking whereby upon final hardening in the oven, the resultant film is smooth and uniform.

The solvent plasticizer should be of a character and included in the varnish in an amount sufficient to maintain the coating flowable for a length of time suitable to obtain even distribution under ordinary baking temperatures which vary, for example, from 500 to 900° F.

Referring to Examples III and V, it is necessary in order to prepare the solution that the mixture be heated at a temperature of about 250° to 300° F. or until the coal tar or chlorinated diphenyl, as the case may be, are entirely incorporated into the mixture. In some cases, the other compositions are similarly heated to produce the required solution, but this is usually unnecessary.

In the case of Example No. 3 the coal tar naphtha acts as a diluent since it is not a solvent for Formvar 15–95 in any proportion. The composition portrayed by Example No. 3 may, if desired, be further diluted with an equal part of kerosene without breaking the resin out of solution.

Another advantage of the solvent plasticizers is that the compatibility of aldehyde polyvinyl resins with such diluents as coal tar naphtha, 52° petroleum naphtha (turpentine substitute), and kerosene is materially improved. Without them even minute percentages of such diluents immediately precipitate the aldehyde polyvinyl resins. In other words, the solvent plasticizers exert, in effect, a compound solvent action.

I claim:

1. The method of forming an insulating coating on wire which comprises continuously coating the same with a baking varnish containing a polyvinyl acetal resin and a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

2. The method of forming an insulating coating on wire which comprises continuously coating the same with a baking varnish containing a polyvinyl acetal resin and a phenol containing material as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

3. The method of forming an insulating coating on wire which comprises continuously coating the same with a baking varnish containing a polyvinyl acetal resin and a resinous material as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

4. The method of forming an insulating coating on wire which comprises continuously coating the same with a baking varnish containing a polyvinyl acetal resin and a natural resin as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

5. The method of forming an insulating coating on wire which comprises continuously coating the same with a baking varnish containing a polyvinyl acetal resin and a synthetic resin as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

6. The method of forming an insulating coating on wire which comprises continuously coating the same with a baking varnish containing a polyvinyl acetal resin and a phenol as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

7. The method of forming an insulating coating on wire which comprises continuously coating the same with a baking varnish containing a polyvinyl acetal resin and a phenolic resin as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

8. The method of forming an insulating coating on wire which comprises continuously coating the same with a baking varnish containing a polyvinyl acetal resin and a chlorinated diphenyl as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

9. The method of forming an insulating coating on wire which comprises continuously coating the same with a baking varnish containing a polyvinyl acetal resin and a viscosity controlling ingredient of a character and in an amount to control viscosity of the coating during initial stages of baking, and a thinner, and baking the coating and during initial stages of baking maintaining viscosity of the coating to a point sufficiently low to permit enough self-flow to distribute the varnish evenly and form under continued heating a hard, smooth, coating of uniform thickness about the wire.

10. The method of forming an insulating coating on wire which comprises continuously coating the same with a baking varnish containing a polyvinyl acetal resin and a phenol containing material as a viscosity controlling ingredient of a character and in an amount to control viscosity of the coating during initial stages of baking, and a hydrocarbon thinner, and baking the coating and during initial stages of baking maintaining viscosity of the coating to a point sufficiently low to permit enough self-flow to distribute the varnish evenly and form under continued heating a hard, smooth, coating of uniform thickness about the wire.

11. The method of forming an insulating coating on wire which comprises continuously coating the same with a baking varnish containing a polyvinyl acetal resin and a phenol containing material as a viscosity controlling ingredient of a character and in an amount to control viscosity of the coating during initial stages of baking, and coal tar naphtha, and baking the coating and during initial stages of baking maintaining viscosity of the coating to a point sufficiently low to permit enough self-flow to distribute the varnish evenly and form under continued heating a hard, smooth, coating of uniform thickness about the wire.

12. The method of forming an insulating coating on wire which comprises continuously coating the same with a baking varnish containing a polyvinyl acetal resin and a viscosity controlling ingredient of a character and in an amount to control viscosity of the coating during initial stages of baking and increase solubility of the polyvinyl acetal resin in a thinner, and a thinner, and baking the coating and during initial stages of baking maintaining viscosity of the coating to a point sufficiently low to permit enough self-flow to distribute the varnish evenly and form under continued heating a hard, smooth, coating of uniform thickness about the wire.

13. Wire coated in accordance with the method of claim 1.

14. Wire coated in accordance with the method of claim 2.

15. Wire coated in accordance with the method of claim 6.

16. Wire coated in accordance with the method of claim 8.

17. Wire coated in accordance with the method of claim 9.

18. Wire coated in accordance with the method of claim 10.

19. Wire coated in accordance with the method of claim 11.

20. Wire coated in accordance with the method of claim 12.

21. The method of forming an insulating coating on wire which comprises continuously coating the same with a baking varnish containing a partial polyvinyl acetal resin and a phenol containing material as a viscosity controlling ingredient of a character and in an amount to control viscosity of the coating during initial stages of baking, and baking the coating and during initial stages of baking maintaining viscosity of the coating to a point sufficiently low to permit enough self-flow to distribute the varnish evenly and form under continued heating a hard, smooth, coating of uniform thickness about the wire.

22. Wire coated in accordance with the method of claim 21.

RAYMOND HENRY THIELKING.